United States Patent
Moniz et al.

(10) Patent No.: US 11,053,797 B2
(45) Date of Patent: Jul. 6, 2021

(54) ROTOR THRUST BALANCED TURBINE ENGINE

(71) Applicant: General Electric Company, Schenectady, NY (US)

(72) Inventors: Thomas Ory Moniz, Loveland, OH (US); Jeffrey Donald Clements, Mason, OH (US)

(73) Assignee: General Electric Company, Schenectady, NY (US)

( * ) Notice: Subject to any disclaimer, the term of this patent is extended or adjusted under 35 U.S.C. 154(b) by 475 days.

(21) Appl. No.: 15/412,216

(22) Filed: Jan. 23, 2017

(65) Prior Publication Data
US 2018/0209273 A1 Jul. 26, 2018

(51) Int. Cl.
*F01D 3/00* (2006.01)
*F01D 5/02* (2006.01)
(Continued)

(52) U.S. Cl.
CPC .............. *F01D 5/027* (2013.01); *F01D 3/00* (2013.01); *F01D 11/005* (2013.01); *F01D 11/08* (2013.01);
(Continued)

(58) Field of Classification Search
CPC .... F02C 7/28; F02C 7/06; F01D 11/02; F01D 1/24; F01D 1/26; F01D 25/16–168; F05D 2240/50–59
See application file for complete search history.

(56) References Cited

U.S. PATENT DOCUMENTS 3,572,728 A * 3/1971 Smuland ................ F01D 11/02
277/419
3,768,921 A * 10/1973 Brown .................... F01D 5/081
415/116
(Continued)

FOREIGN PATENT DOCUMENTS

EP 1 340 902 A2 9/2003
EP 1 655 475 A1 5/2006
(Continued)

OTHER PUBLICATIONS

Extended European Search Report and Opinion issued in connection with corresponding EP Application No. 18151720.2 dated May 18, 2018.

*Primary Examiner* — Gerald L Sung
*Assistant Examiner* — Marc J Amar
(74) *Attorney, Agent, or Firm* — Dority & Manning, P.A.

(57) ABSTRACT

The present disclosure is directed to a rotor thrust balanced turbine engine that may increase engine performance and efficiency while managing thrust mismatch or imbalance in a low pressure (LP) spool between a fan assembly and a turbine rotor assembly. The gas turbine engine defines a radial direction, a longitudinal direction, and a circumferential direction, an upstream end and a downstream end along the longitudinal direction, and an axial centerline extended along the longitudinal direction. The gas turbine engine includes a turbine rotor assembly and a turbine frame. The turbine rotor assembly defines a first flowpath radius and a second flowpath radius each extended from the axial centerline. The first flowpath radius is disposed at the upstream end of the turbine rotor assembly, and wherein the second flowpath radius is disposed at the downstream end of the turbine rotor assembly. The turbine frame and the turbine rotor assembly together define a seal interface radius inward of the turbine rotor assembly along the radial direction and
(Continued)

concentric to the axial centerline, and wherein the turbine rotor assembly defines a ratio of the first flowpath radius to the seal interface radius less than or equal to approximately 1.79.

18 Claims, 3 Drawing Sheets

(51) Int. Cl.
| | |
|---|---|
| F01D 25/16 | (2006.01) |
| F02C 7/28 | (2006.01) |
| F01D 11/00 | (2006.01) |
| F01D 11/08 | (2006.01) |
| F01D 25/24 | (2006.01) |
| F04D 25/04 | (2006.01) |
| F04D 29/053 | (2006.01) |
| F04D 29/32 | (2006.01) |

(52) U.S. Cl.
CPC .............. *F01D 25/16* (2013.01); *F01D 25/24* (2013.01); *F02C 7/28* (2013.01); *F04D 25/045* (2013.01); *F04D 29/053* (2013.01); *F04D 29/325* (2013.01); *F05D 2220/32* (2013.01)

(56) References Cited

U.S. PATENT DOCUMENTS

| | | | | |
|---|---|---|---|---|
| 3,989,410 | A * | 11/1976 | Ferrari | F01D 3/00 415/115 |
| 4,578,018 | A * | 3/1986 | Pope | F01D 3/04 384/420 |
| 4,595,340 | A * | 6/1986 | Klassen | F01D 5/147 416/193 A |
| 4,827,712 | A | 5/1989 | Coplin | |
| 4,864,810 | A * | 9/1989 | Hines | F01D 3/04 60/775 |
| 5,400,952 | A * | 3/1995 | Hetico | F16J 15/3288 228/177 |
| 5,402,636 | A * | 4/1995 | Mize | F01D 3/00 60/806 |
| 5,632,600 | A * | 5/1997 | Hull | F01D 5/06 416/198 A |
| 6,035,627 | A * | 3/2000 | Liu | F04D 29/284 60/785 |
| 6,540,231 | B1 * | 4/2003 | Trantow | F01D 11/02 277/355 |
| 7,770,377 | B2 | 8/2010 | Rolt | |
| 8,074,440 | B2 | 12/2011 | Kohlenbert et al. | |
| 8,517,666 | B2 | 8/2013 | Alvanos et al. | |
| 8,600,707 | B1 * | 12/2013 | El-Aini | F01D 11/02 703/1 |
| 8,844,265 | B2 | 9/2014 | Adams et al. | |
| 9,303,589 | B2 | 4/2016 | Heikurinen et al. | |
| 9,534,497 | B2 | 1/2017 | Kuchana et al. | |
| 2003/0097844 | A1 * | 5/2003 | Seda | F01D 25/162 60/791 |
| 2003/0163984 | A1 * | 9/2003 | Seda | F01D 9/041 60/226.1 |
| 2004/0031260 | A1 * | 2/2004 | Orlando | F01D 1/26 60/226.1 |
| 2007/0059158 | A1 * | 3/2007 | Alvanos | F01D 5/081 415/115 |
| 2009/0047123 | A1 * | 2/2009 | Glahn | F02C 7/28 415/173.7 |
| 2009/0047124 | A1 * | 2/2009 | Glahn | F01D 11/025 415/174.5 |
| 2009/0051119 | A1 * | 2/2009 | Glahn | F16J 15/4472 277/400 |
| 2009/0051120 | A1 * | 2/2009 | Munsell | F01D 11/02 277/400 |
| 2009/0212501 | A1 * | 8/2009 | Glahn | F16J 15/3472 277/400 |
| 2010/0154433 | A1 * | 6/2010 | Ottaviano | F02C 7/18 60/785 |
| 2012/0073263 | A1 | 3/2012 | Kohlenberg et al. | |
| 2013/0192196 | A1 | 8/2013 | Suciu et al. | |
| 2013/0192200 | A1 | 8/2013 | Kupratis et al. | |
| 2013/0195627 | A1 * | 8/2013 | Glahn | F01D 11/001 415/126 |
| 2016/0214727 | A1 | 7/2016 | Hamel et al. | |
| 2017/0107839 | A1 * | 4/2017 | Glahn | F01D 11/02 703/1 |
| 2017/0342851 | A1 * | 11/2017 | Narasimharao | F01D 5/12 |
| 2019/0093496 | A1 * | 3/2019 | Hardikar | F16J 15/4476 |

FOREIGN PATENT DOCUMENTS

| | | | | |
|---|---|---|---|---|
| EP | 2025876 A2 * | 2/2009 | ............... | F16J 15/34 |
| FR | 3029982 A1 * | 6/2016 | ............ | F01D 11/025 |
| RU | 2 534 684 C1 | 12/2014 | | |

* cited by examiner

ROTOR THRUST BALANCED TURBINE ENGINE

FIELD

The present subject matter relates generally to gas turbine engine architecture. More particularly, the present subject matter relates to a turbine section for gas turbine engines.

BACKGROUND

Gas turbine engines generally include a turbine section downstream of a combustion section that is rotatable with a fan assembly to rotate and operate the gas turbine engine to generate propulsive thrust. General gas turbine engine design criteria often include conflicting criteria that must be balanced or compromised, including increasing fuel efficiency, operational efficiency, and/or power output while balancing thrust loads and accounting for structural life of various components.

In direct drive gas turbine engines, a low pressure (LP) turbine rotor assembly and the fan assembly are each coupled to a LP shaft to define an LP spool without a reduction gearbox therebetween (i.e. the turbine rotor assembly and the fan assembly rotate at approximately the same rotational speed). General LP turbine rotor assembly design criteria include balancing loads at one or more thrust bearing assemblies on the low pressure spool that are produced by the thrust generated by the turbine rotor assembly and/or the fan assembly. Thus, conventionally, increased thrust outputs, such as from larger fan diameters, generally induces increased engine radii, such as larger LP turbine rotor radii. Larger LP turbine rotor radii may generally lead to requiring more robust (e.g. larger diameter) bearing assemblies to compensate for or balance the increased thrust load on the thrust bearing. Larger thrust outputs may further lead to larger seal interface diameters, thereby increasing leakages, decreasing efficiency, and/or decreasing performance.

Therefore, there is a need for systems and methods of defining a turbine rotor assembly that may increase engine performance and efficiency while managing thrust mismatch in the LP spool.

BRIEF DESCRIPTION

Aspects and advantages of the invention will be set forth in part in the following description, or may be obvious from the description, or may be learned through practice of the invention.

The present disclosure is directed to a rotor thrust balanced turbine engine that may increase engine performance and efficiency while managing thrust mismatch or imbalance in a low pressure (LP) spool between a fan assembly and a turbine rotor assembly. The gas turbine engine defines a radial direction, a longitudinal direction, and a circumferential direction, an upstream end and a downstream end along the longitudinal direction, and an axial centerline extended along the longitudinal direction. The gas turbine engine includes a turbine rotor assembly and a turbine frame. The turbine rotor assembly defines a first flowpath radius and a second flowpath radius each extended from the axial centerline. The first flowpath radius is disposed at the upstream end of the turbine rotor assembly, and wherein the second flowpath radius is disposed at the downstream end of the turbine rotor assembly. The turbine frame and the turbine rotor assembly together define a seal interface radius inward of the turbine rotor assembly along the radial direction and concentric to the axial centerline, and wherein the turbine rotor assembly defines a ratio of the first flowpath radius to the seal interface radius less than or equal to approximately 1.79.

In one embodiment, the turbine rotor assembly defines a ratio of the second flowpath radius to seal interface radius less than or equal to approximately 1.74.

In another embodiment, the turbine rotor assembly defines a range of ratios of the first flowpath radius to the seal interface radius of approximately 1.79 to approximately 1.50.

In still another embodiment, the seal interface radius is approximately 130 mm to approximately 430 mm.

In other embodiments, the turbine rotor assembly defines a range of ratios of the second flowpath radius to the seal interface radius of approximately 1.74 to approximately 1.50.

In various embodiments, the gas turbine engine defines a sea level thrust imbalance range of approximately 44 kN to approximately 515 kN.

In still various embodiments, the seal interface radius is approximately 430 mm or less and the gas turbine engine defines a sea level rotor thrust imbalance of at least approximately 44 kN. In another embodiment, the gas turbine engine defines a sea level thrust imbalance range of approximately 44 kN to approximately 165 kN.

In one embodiment, the seal interface radius is approximately 220 mm to approximately 430 mm, and the gas turbine engine defines a sea level thrust imbalance range of at least approximately 340 kN.

In another embodiment, the seal interface radius is approximately 130 mm to 220 mm, and the gas turbine engine defines a sea level rotor thrust imbalance of at least approximately 44 kN.

In various embodiments, the seal interface radius is approximately 220 mm to approximately 430 mm, and wherein the gas turbine engine defines a sea level rotor thrust imbalance of approximately 515 kN or less. In one embodiment, the gas turbine engine defines a sea level rotor thrust imbalance of at least approximately 165 kN.

In still various embodiments, the turbine frame and turbine rotor assembly together define a seal interface at the seal interface radius. In one embodiment, the seal interface defines a first cavity generally inward of a second cavity along the radial direction, and the second cavity defines a higher pressure than the first cavity. In another embodiment, the seal interface defines a shroud at the turbine frame and a knife edge seal at the turbine rotor assembly.

In one embodiment, the first flowpath radius corresponds to a first rotating stage of the turbine rotor assembly.

In another embodiment, the second flowpath radius corresponds to a last rotating stage of the turbine rotor assembly.

In yet another embodiment, the first and second flowpath radii each correspond to an inner radius of a core flowpath of the engine.

In various embodiments, the gas turbine engine further includes a fan assembly including a fan rotor and a driveshaft extended along the longitudinal direction. The driveshaft is rotatably coupled at the upstream end to the fan rotor and rotatably coupled at the downstream end to the turbine rotor assembly. In one embodiment, the gas turbine engine defines a direct drive engine, and the fan rotor and the turbine rotor assembly rotate at approximately the same rotational speed.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
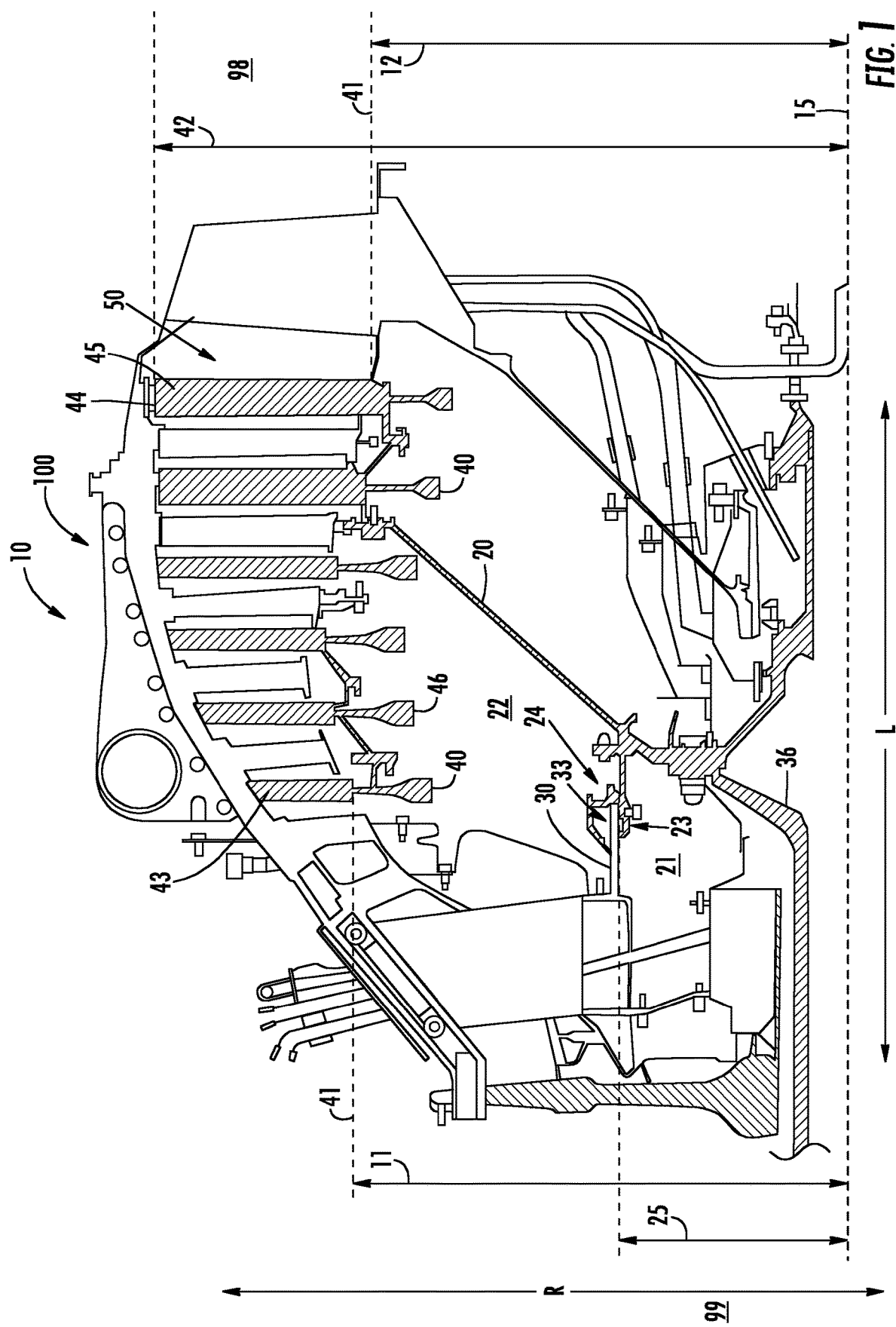
FIG. 1 is a cross sectional view of an exemplary embodiment of a turbine section of a gas turbine engine.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows. Unless otherwise stated, "downstream" and "upstream" refer to the general direction of fluid flow of air or resulting combustion gases through a core flowpath of the engine from entry in the compressor section through exit from a turbine section.

The term "sea level" or "sea level thrust output" is used as generally known in the art in reference to thrust output of a gas turbine engine based on standards and conditions generally known in the art, such as, but not limited to, the International Standard Atmosphere (ISA) or equivalent. Thus, "sea level" may include specific standard pressure, temperature, density, viscosity, altitude, elevation, and/or other parameters used when defining or comparing thrust output of a gas turbine engine. However, "sea level" is not to be construed or imply limitation to a specific pressure, temperature, density, viscosity, altitude, elevation or other parameter and is used insofar as to provide comparison within the art. As such, limitations based at least in part on "sea level" may be understood as at ISA as defined by the International Organization for Standardization (ISO), but may be translated, as necessary, to equivalents based at least in part on other standards.

The terms "rotor thrust imbalance", "thrust imbalance", "thrust mismatch", or "thrust balance" are generally known in the art in reference to generally axial forces within an engine and a net axial force resulting from a fan assembly and/or compressor section versus a turbine rotor assembly. Thrust output is generally a component of thrust imbalance. In various embodiments, thrust output of an engine may be approximately equal to a resultant rotor thrust imbalance reacted by a thrust bearing on a spool. Unless otherwise specified, "rotor thrust imbalance", "thrust imbalance", "thrust mismatch", or "thrust balance" used herein will refer to a resultant low pressure (LP) spool rotor thrust (or force) imbalance reacted by a thrust bearing at the LP spool.

A rotor thrust balanced turbine engine is generally provided that may increase engine performance and efficiency while managing thrust mismatch or imbalance in a low pressure (LP) spool between a fan assembly and a turbine rotor assembly. In particular embodiments, the thrust mismatch or imbalance in the LP spool is generally managed by adjusting (e.g., decreasing) the ratio of a seal interface radius to a flowpath radius defined at the first rotor of the turbine and/or the last rotor of the turbine.

Referring now to the drawings, FIG. 1 is a schematic cross sectional view of an exemplary embodiment of a turbine section 100 of a rotor thrust balanced turbine engine 10 (herein after "engine 10"). The engine 10 generally includes a turbine rotor assembly 20 and a turbine frame 30. The turbine rotor assembly 20 defines a first flowpath radius 11 and a second flowpath radius 12 each extended from an axial centerline 15 extended along a longitudinal direction L. The first flowpath radius 11 is disposed at an upstream end 99 of the turbine rotor assembly 20 and the second flowpath radius 12 is disposed at a downstream end 98 of the turbine rotor assembly 20. The turbine frame 30 and the turbine rotor assembly 20 together define a seal interface radius 25 inward along a radial direction R of the turbine rotor assembly 20 and concentric to the axial centerline 15. The turbine rotor assembly 20 defines a ratio of the first flowpath radius 11 to the seal interface radius 25 less than or equal to approximately 1.79. In various embodiments, the turbine rotor assembly 20 further defines a ratio of the second flowpath radius 12 to the seal interface radius 25 less than or equal to approximately 1.74. At such ratios, the thrust mismatch may be reduced at the LP spool 65.

The turbine rotor assembly 20 may include a plurality of turbine rotors 40 coupled along the longitudinal direction L. Various embodiments of the turbine rotor assembly 20 include at least two turbine rotors 40, in which each rotor 40 includes a plurality of airfoils 45 in circumferential arrangement along a disk or hub 46. The disk or hub 46 extends generally and at least partially along the radial direction R. In one embodiment, the airfoils 45 and the disk or hub 46 may be integrally formed together, such as to form a bladed disk (e.g. Blisk) or integrally bladed rotor (e.g. IBR). In another embodiment, the airfoils 45 may be placed or otherwise attached to the disk or hub 46, such as by placing into a dovetail slot and including one or more of retainers, seals, fasteners, or other mechanical retention mechanisms.

Each of the plurality of turbine rotors 40 defines an inner radius 41 and an outer radius 42 along a core flowpath 50 that extends through the engine 10 generally along the longitudinal direction L. The turbine rotor assembly 20 generally defines an altering inner and/or outer radius 41, 42 along the core flowpath 50 along the longitudinal direction L. For example, as air flows through the engine 10 along the core flowpath 50 and increases in pressure, the inner and/or outer radius 41, 42 may converge toward the other. As air flows through a combustion section 80 (shown in FIG. 2) and is mixed and ignited with a fuel, the resulting combustion gases may flow through the turbine section 100 along the core flowpath 50 in which the inner and/or outer radius 41, 42 may diverge from the other.

In various embodiments, the first flowpath radius 11 corresponds to the inner radius 41 of a first rotor 43 from the upstream end 99 of the turbine rotor assembly 20. In various embodiments, the second flowpath radius 12 corresponds to the inner radius 41 of a last rotor 44 from the upstream end 99 of the turbine rotor assembly 20. For example, the second flowpath radius 12 corresponds to the inner radius 41 at the downstream end 98 of the turbine rotor assembly 20.

In still various embodiments, the turbine frame 30 and the turbine rotor assembly 20 together define a seal interface 24 at the seal interface radius 25. The seal interface 24 separates a first cavity 21 generally upstream of the seal interface 24 and defining a higher pressure than a second cavity 22 generally downstream of the seal interface 24. The seal interface 24 defines a static-to-rotating seal interface. In one embodiment, the turbine frame 30 defines a shroud 33 and the turbine rotor assembly 20 defines a knife-edge seal 23 adjacent to the shroud 33 (e.g. adjacent along the radial direction R).

Figure 2:
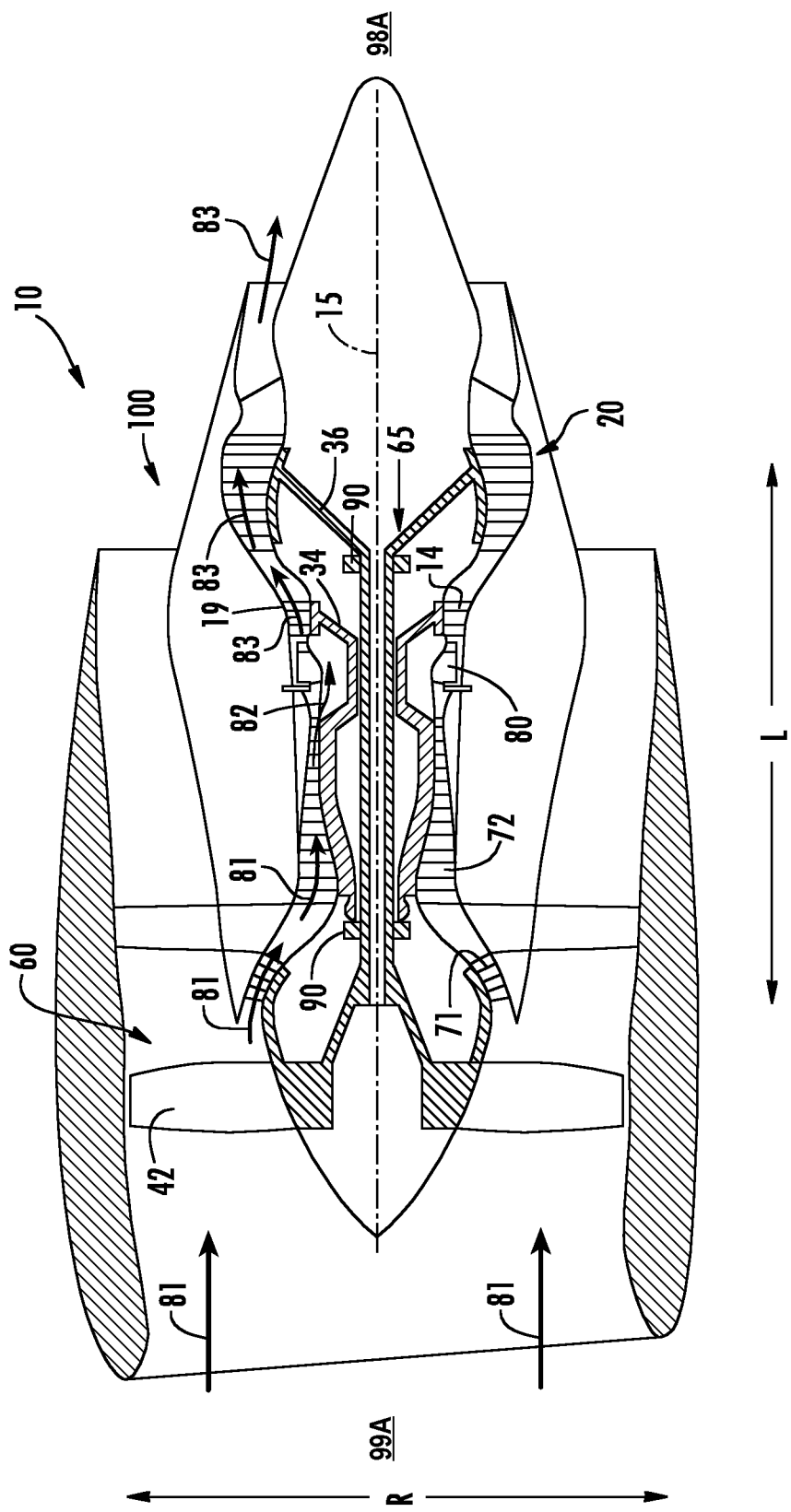
FIG. 2 is a schematic cross sectional view of an exemplary gas turbine engine incorporating an exemplary embodiment of the turbine section shown in FIG. 1.

Referring now to FIG. 2, an exemplary embodiment of an engine 10 including the turbine rotor assembly 20 shown in FIG. 1 is generally provided. The engine 10 further includes a direct drive fan assembly 60 disposed at the upstream end 99A of the engine and rotatably coupled to a low pressure (LP) shaft 36 extended along the longitudinal direction L. The LP shaft 36 is rotatably coupled to the turbine rotor assembly 20 at the downstream end 98A of the engine 10. The turbine rotor assembly 20 drives the fan assembly 60 generally at a rotational speed approximately equal to the turbine rotor assembly 20 rotational speed. However, it should be understood that the rotational speed may vary when calculated as a corrected rotor speed in light of differences in temperature, pressure, and/or radius, among other factors, between the fan assembly 60 and the turbine rotor assembly 20.

The engine 10 shown in FIG. 2 may further include a first compressor 71 including a plurality of stages of airfoils along the longitudinal direction L may be disposed downstream of the fan assembly 60. The first compressor 71 may be coupled to the LP shaft 36 in co-rotation with the fan assembly 60 and the turbine section 20. In various embodiments, the first compressor 71 may be referred to as a low pressure compressor or an intermediate pressure compressor. In other embodiments, the first compressor 71 may represent an extension of the fan assembly 60, such as a plurality of stages of fan airfoils along the longitudinal direction L (i.e. a multi-stage fan). The first compressor 71, the fan assembly 60, and the turbine rotor assembly 20 may together rotate at approximately the same rotational speed, subject to variations in design point corrected rotational speed due to differences in pressure, temperature, and/or radius, among other factors.

The engine 10 shown in FIG. 2 may further include a second compressor 72 including a plurality of stages of airfoils along the longitudinal direction L disposed downstream of the first compressor 71. In various embodiments, the second compressor 72 may define a high pressure compressor rotatably coupled to a high pressure (HP) shaft 34. The HP shaft 34 is further coupled to and rotatable with an HP turbine rotor 19 disposed generally upstream of the turbine rotor assembly 20 shown in FIG. 1 and described herein. As such, the engine 10 shown in FIG. 1 includes, in serial arrangement along the longitudinal direction L, the fan assembly 60, the first compressor 71, the second compressor 72, the combustion section 80, the HP turbine 19, and the turbine rotor assembly 20.

In other embodiments, the engine 10 may further include an additional compressor disposed between the first and second compressors 71, 72. For example, the engine 10 may include a low pressure compressor, an intermediate pressure compressor, and a high pressure compressor. In still other embodiments, the additional compressor may be connected to and rotatable with an additional shaft and turbine. For example, the engine 10 may include an intermediate pressure compressor coupled to an intermediate pressure shaft and rotatable with an intermediate pressure turbine. The intermediate pressure turbine may be disposed between the HP turbine 19 and the turbine rotor assembly 20 along the longitudinal direction L.

As previously mentioned, the engine 10 includes the combustion section 80 disposed between the compressors 71, 72 together and the turbines 19, 20 together along the longitudinal direction L. As shown via arrows schematically in FIG. 2, air 81 flows from the upstream end 99A across the fan assembly 60 into the core flowpath 50 at least partially defined by the compressors 71, 72, the combustion section 80, and the turbines 19, 20 of the engine 10. As the air 81 flows across each stage of the fan assembly 60 and compressors 71, 72, the pressure increases. Compressed air 82 exiting the compressors 71, 72 enters the combustion section 80 in which the compressed air 82 is mixed with fuel and ignited to form combustion gases 83. The high pressure combustion gases 83 flow across the turbines 19, 20 and is exhausted through the downstream end 98A of the engine 10.

Though not shown in greater detail, each combination of the fan assembly and/or compressor, shaft, and turbine includes a plurality of bearing assemblies 90 to facilitate rotation within a static structure (e.g. a frame, such as the turbine frame 30). Additionally, one or more of the bearing assemblies 90 generally defines a thrust bearing designed to withstand or support loads along the longitudinal direction L. For example, the thrust bearing may include, but is not limited to, spherical roller bearings, ball bearings, tapered roller bearings, or fluid film bearings, or combinations thereof. Therefore, the combination of the fan assembly 60, the LP shaft 36, and the turbine rotor assembly 20 may generally include a plurality of bearing assemblies 90 in which one or more of the bearing assemblies defines a thrust bearing.

The compressed air 82 and combustion gases 83 each result in high pressure sections and/or cavities of the engine 10. For example, the combustion section 80 generally includes higher pressure cavities than those downstream, such as the HP turbine 19, and even more so, such as the turbine rotor assembly 20.

Thus, referring now to FIGS. 1 and 2, the engine 10 defines the first cavity 21 generally between the HP turbine 19 and the turbine rotor assembly 20 downstream of the HP turbine 19. The first cavity 21 defines a generally lower pressure than the second cavity 22 outward thereof along the radial direction R. The higher pressure of the second cavity 22 generally influences rotor thrust balance between the fan assembly 60 and the turbine rotor assembly 20, together defining a low pressure (LP) spool 65. In the second cavity 22, such as between the seal interface radius 25 and the first flowpath radius 11, the second cavity 22 defines the highest pressure influencing rotor thrust balance. Larger fan assembly 60 diameters generally require or result in larger turbine rotor assembly 20 diameters. By defining a ratio between the seal interface 25 and the first flowpath radius 11, the engine 10 may define a relationship between the turbine rotor assembly 20 and the fan assembly 60 that produces a desired quantity of thrust while limiting turbine rotor assembly diameter and/or maintaining thrust balance in the LP spool 65.

In various embodiments, the area between the second flowpath radius 12 and the seal interface 25 defines a counteracting lower pressure versus the second cavity 22. As such, further defining a ratio between the seal interface 25 and the second flowpath radius 12 further defines the relationship between the turbine rotor assembly 20 and the fan assembly 60 such that the engine 10 produces a desired quantity of thrust while limiting turbine rotor assembly diameter and/or maintaining thrust balance in the LP spool 65.

In various embodiments, the engine 10 defines a range of ratios of the first flowpath radius 11 to the seal interface radius 25 of approximately 1.79 to approximately 1.50. In one embodiment of the engine 10, the seal interface radius 25 is between approximately 130 mm and approximately 430 mm while defining a ratio of the first flowpath radius 11 to the seal interface 25 of approximately 1.79 or less. In various other embodiments, the engine 10 further defines a ratio of the second flowpath radius 12 to the seal interface radius 25 less than or equal to approximately 1.74. In one embodiment, the engine 10 defines a range of ratios of the second flowpath radius 12 to the seal interface radius 25 of approximately 1.74 to approximately 1.50.

The engine 10 may define a rotor thrust imbalance at sea level of at least approximately 44 kN. In various embodiments, the engine 10 may define a thrust imbalance range of approximately 44 kN to approximately 515 kN. In one embodiment, the engine 10 defines the seal interface radius 25 of approximately 430 mm or less while producing a rotor thrust imbalance of at least approximately 44 kN. In another embodiment, the engine 10 defines the seal interface radius 25 of approximately 430 mm or less while producing a rotor thrust imbalance between approximately 44 kN and approximately 165 kN.

In another embodiment, the engine 10 defines the seal interface radius 25 of approximately 130 mm to 220 mm while producing a sea level rotor thrust imbalance of at least approximately 44 kN. In another embodiment, the engine 10 defines a sea level rotor thrust imbalance of approximately 165 kN or less.

In still another embodiment of the engine 10, the seal interface radius 25 is approximately 220 mm to approximately 430 mm. In one embodiment, the engine 10 defines a sea level rotor thrust imbalance of at least approximately 44 kN. In another embodiment, the engine 10 defines a sea level rotor thrust imbalance of approximately 515 kN or less.

Figure 3:
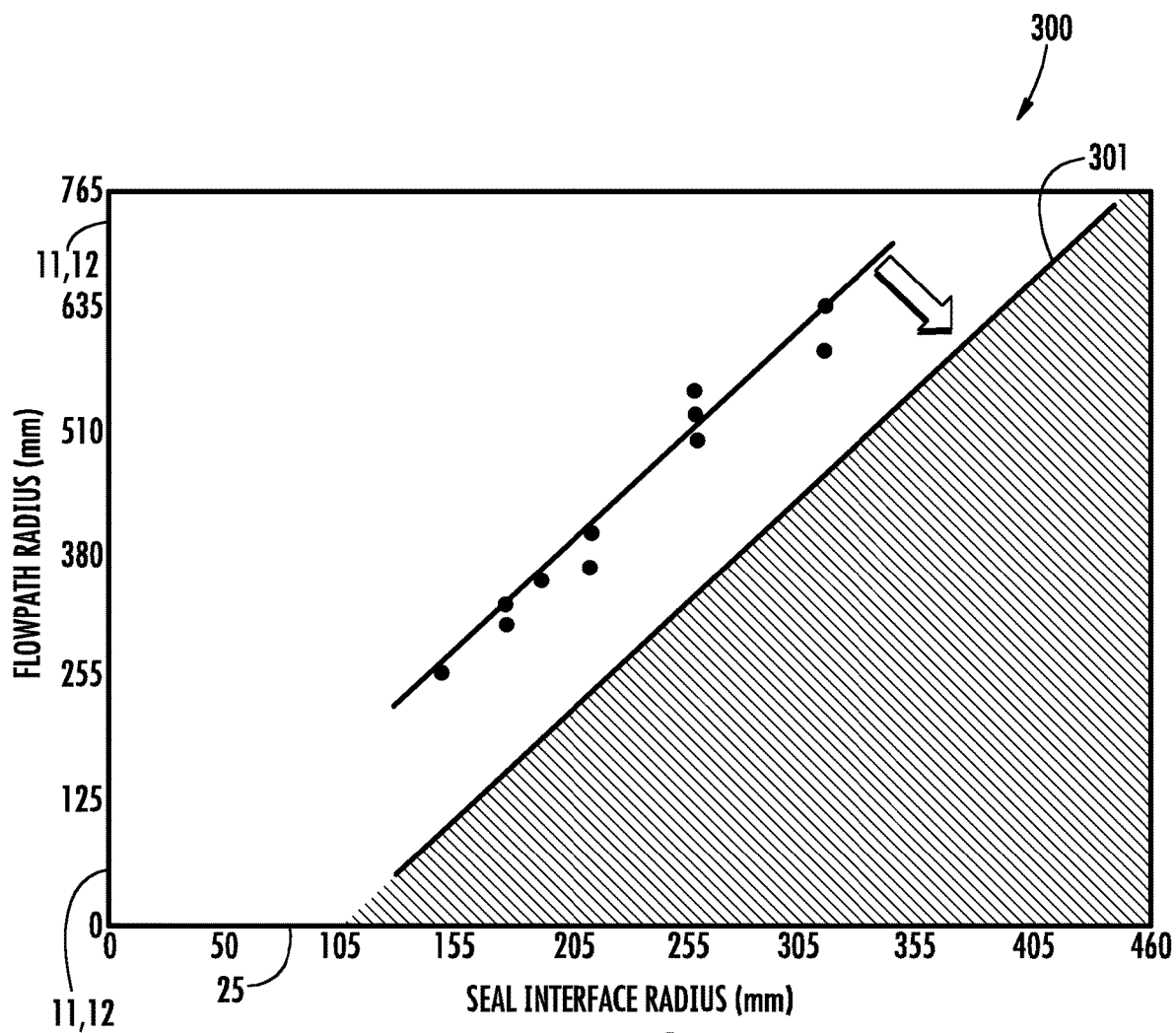
FIG. 3 is an exemplary embodiment of a graph depicting relationships of seal interface radius to turbine flowpath radius.

Referring now to FIG. 3, an exemplary graph 300 is generally provided depicting a contrast between the disclosed and known ratios between the first and/or second flowpath radii 11, 12 versus the seal interface radius 25. The exemplary graph 300 depicts the disclosed ratios as shifting the ratios or slope 301 of first and/or second flowpath radii 11, 12 over seal interface radius 25 to approximately 1.79 or less. Referring to FIGS. 1-3, shifting the ratios or slopes 301 of the first and/or second flowpath radii 11, 12 over seal interface radius 25 may include defining relationships between the first flowpath radius 11 and/or the second flowpath radius 12 versus the seal interface radius 25. For example, a desired rotor thrust imbalance of the engine 10, among other factors, such as, but not limited to, LP turbine stage loading and/or rotor speed (e.g., $AN^2$), may generally define an axial or longitudinal length of the turbine rotor assembly 20. However, additionally defining ratios of the first flowpath radius 11 and/or the second flowpath radius 12 versus the seal interface 25 may further define increasing the first flowpath radius 11 while decreasing the second flowpath radius 12, each relative to the seal interface 25.

By defining relationships between the first flowpath radius 11 and/or the second flowpath radius 12 versus the seal interface radius 25, the engine 10 manages rotor thrust balance while minimizing seal interface radius 25, which may thus minimize leakage and loss of efficiency and performance. In various embodiments, the engine 10 improves rotor thrust balance across the LP spool 65, which minimizes wear and increases structural life of the bearing assemblies 90 along the LP spool 65.

Additionally, the defined ratios of the first flowpath radius 11 and/or the second flowpath radius 12 versus the seal interface radius 25 may improve performance of direct drive LP turbines in direct drive engines in contrast to indirect drive (e.g. geared) engine configurations. As larger radius LP turbines generally drive thrust mismatch in the LP spool, the defined ratios may improve rotor thrust balance while also enabling each of the fan assembly 60, the turbine rotor assembly 20, and the engine 10 to operate at greater fan pressure ratios, overall pressure ratios, and more ideal speeds without the added weight, longitudinal dimension, complexity, and risk of a geared configuration.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine defining a radial direction, a longitudinal direction, and a circumferential direction, and an axial centerline extended along the longitudinal direction, the gas turbine engine comprising:
  a low pressure spool comprising a fan assembly and a turbine rotor assembly, wherein the low pressure spool is connected to a bearing assembly, and wherein the turbine rotor assembly defines a first flowpath radius and a second flowpath radius each extended from the axial centerline, wherein the first flowpath radius is disposed at an upstream end of the turbine rotor assembly, wherein the upstream end is at a forward edge of a blade of a first rotating stage of the turbine rotor assembly, and wherein the second flowpath radius is disposed at a downstream end of the turbine rotor assembly; and
  a turbine frame, wherein the turbine frame and the turbine rotor assembly together define a seal interface, the seal interface positioned forward of or aligned along the radial direction with the upstream end of the turbine rotor assembly, and the seal interface having a seal interface radius inward of the turbine rotor assembly along the radial direction and concentric to the axial centerline, and wherein the turbine rotor assembly defines a ratio of the first flowpath radius to the seal interface radius, the ratio of the first flowpath radius to the seal interface radius defining at least in part a thrust balance at the bearing assembly at the low pressure spool, wherein the ratio of the first flowpath radius to the seal interface radius is less than or equal to 1.79.

2. The gas turbine engine of claim 1, wherein the turbine rotor assembly defines a ratio of the second flowpath radius to seal interface radius less than or equal to 1.74.

3. The gas turbine engine of claim 1, wherein the turbine rotor assembly defines a range of ratios of the first flowpath radius to the seal interface radius of 1.79 to 1.50.

4. The gas turbine engine of claim 1, wherein the seal interface radius is 130 mm to 430 mm.

5. The gas turbine engine of claim 1, wherein the turbine rotor assembly defines a range of ratios of the second flowpath radius to the seal interface radius of 1.74 to 1.50.

6. The gas turbine engine of claim 1, wherein the gas turbine engine defines a sea level thrust imbalance range between 44 kN and 515 kN.

7. The gas turbine engine of claim 1, wherein the seal interface radius is 430 mm or less, and wherein the gas turbine engine defines a sea level rotor thrust imbalance of at least 44 kN.

8. The gas turbine engine of claim 1, wherein the seal interface radius is 220 mm to 430 mm, and wherein the gas turbine engine defines a sea level thrust imbalance range of at least 340 kN.

9. The gas turbine engine of claim 1, wherein the seal interface radius is between 130 mm and 220 mm, and wherein the gas turbine engine defines a sea level rotor thrust imbalance of at least 44 kN.

10. The gas turbine engine of claim 1, wherein the turbine frame and turbine rotor assembly together define the seal interface at the seal interface radius.

11. The gas turbine engine of claim 10, wherein the seal interface defines a first cavity generally inward of a second cavity along the radial direction, and wherein the second cavity defines a higher pressure than the first cavity.

12. The gas turbine engine of claim 10, wherein the seal interface defines a shroud at the turbine frame and a knife edge seal at the turbine rotor assembly.

13. The gas turbine engine of claim 10, wherein the seal interface defines a first cavity and a second cavity, and wherein the second cavity defines a higher pressure than the first cavity.

14. The gas turbine engine of claim 1, wherein the second flowpath radius corresponds to a last rotating stage of the turbine rotor assembly.

15. The gas turbine engine of claim 1, wherein the first and second flowpath radii each correspond to an inner radius of a core flowpath of the engine.

16. The gas turbine engine of claim 1, wherein the gas turbine engine defines a direct drive engine, and wherein a fan rotor and the turbine rotor assembly rotate at the same rotational speed.

17. A gas turbine engine defining a radial direction, a longitudinal direction, and a circumferential direction, and an axial centerline extended along the longitudinal direction, the gas turbine engine comprising:
a low pressure spool comprising a fan assembly and a turbine rotor assembly, the fan assembly and the turbine rotor assembly rotatably connected to one another by a shaft, wherein the low pressure spool is connected to a bearing assembly at the shaft, and wherein the turbine rotor assembly defines a first flowpath radius and a second flowpath radius each extended from the axial centerline, wherein the first flowpath radius corresponds to a forward edge of a blade of a first rotating stage of the turbine rotor assembly and the second flowpath radius corresponds to a last rotating stage of the turbine rotor assembly, and wherein the first flowpath radius is disposed at an upstream end of the turbine rotor assembly and the second flowpath radius is disposed at a downstream end of the turbine rotor assembly; and
a turbine frame, wherein the turbine frame and the turbine rotor assembly together define a seal interface, the seal interface positioned forward of or aligned along the radial direction with the upstream end of the turbine rotor assembly, and the seal interface having a seal interface radius inward of the turbine rotor assembly along the radial direction and concentric to the axial centerline, and wherein the turbine rotor assembly defines a ratio of the first flowpath radius to the seal interface radius, the ratio of the first flowpath radius to the seal interface radius and a ratio of the second flowpath radius to the seal interface radius together defining at least in part a thrust balance at the bearing assembly at the low pressure spool, wherein the ratio of the first flowpath radius to the seal interface radius is less than or equal 1.79, and wherein the ratio of the second flowpath radius to the seal interface radius is less than or equal 1.74.

18. A gas turbine engine defining a radial direction, a longitudinal direction, and a circumferential direction, and an axial centerline extended along the longitudinal direction, the gas turbine engine comprising:
a low pressure spool comprising a fan assembly and a turbine rotor assembly, the fan assembly and the turbine rotor assembly rotatably connected to one another by a shaft, wherein the low pressure spool is connected to a bearing assembly at the shaft, and wherein the turbine rotor assembly defines a first flowpath radius corresponding to a forward edge of a blade of a first rotating stage and the turbine rotor assembly defines a second flowpath radius corresponding to a last rotating stage, wherein the first flowpath radius is disposed at an upstream end of the turbine rotor assembly and the second flowpath radius is disposed at a downstream end of the turbine rotor assembly, and wherein the first flowpath radius and the second flowpath radius are each extended from the axial centerline; and
a turbine frame, wherein the turbine frame and the turbine rotor assembly together define a seal interface, the seal interface positioned forward of or aligned along the radial direction with the upstream end of the turbine rotor assembly, and the seal interface having a seal interface radius inward of the turbine rotor assembly along the radial direction and concentric to the axial centerline, and wherein the turbine rotor assembly defines a ratio of the first flowpath radius to the seal interface radius, and wherein the turbine rotor assembly defines a ratio of the second flowpath radius to the seal interface radius, defining at least in part a thrust balance range between 44 kN and 515 kN at the bearing assembly at the low pressure spool, and wherein the ratio of the second flowpath radius to the seal interface radius is less than or equal 1.74.

* * * * *